United States Patent
Mate et al.

(10) Patent No.: US 10,863,139 B2
(45) Date of Patent: Dec. 8, 2020

(54) PRIVACY PRESERVING MONITORING

(71) Applicant: Nokia Technologies Oy, Espoo (FI)

(72) Inventors: Sujeet Shyamsundar Mate, Tampere (FI); Antti Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 88 days.

(21) Appl. No.: 15/754,791

(22) PCT Filed: Sep. 7, 2015

(86) PCT No.: PCT/FI2015/050583
§ 371 (c)(1),
(2) Date: Feb. 23, 2018

(87) PCT Pub. No.: WO2017/042419
PCT Pub. Date: Mar. 16, 2017

(65) Prior Publication Data
US 2018/0249125 A1   Aug. 30, 2018

(51) Int. Cl.
| | |
|---|---|
| *H04N 7/18* | (2006.01) |
| *H04N 7/167* | (2011.01) |
| *G08B 21/04* | (2006.01) |
| *G06F 21/62* | (2013.01) |
| *H04L 29/06* | (2006.01) |

(52) U.S. Cl.
CPC ....... *H04N 7/1675* (2013.01); *G06F 21/6245* (2013.01); *G06F 21/6254* (2013.01); *G08B 21/0476* (2013.01); *H04L 63/0421* (2013.01); *H04N 7/18* (2013.01); *H04N 7/183* (2013.01)

(58) Field of Classification Search
None
See application file for complete search history.

(56) References Cited

U.S. PATENT DOCUMENTS

| | | |
|---|---|---|
| 7,039,810 B1 | 5/2006 | Nichols |
| 8,239,928 B2 | 8/2012 | Huang et al. |
| 8,516,514 B2 | 8/2013 | Belz et al. |
| 2008/0117295 A1 | 5/2008 | Ebrahimi et al. |
| 2008/0198159 A1 | 8/2008 | Liu et al. |
| 2008/0222734 A1* | 9/2008 | Redlich ................... H04L 63/02 726/26 |

(Continued)

FOREIGN PATENT DOCUMENTS

| | | |
|---|---|---|
| CN | 103177007 A | 6/2013 |
| CN | 104270614 A | 1/2015 |

OTHER PUBLICATIONS

Zhang et al., "Privacy Preserving Automatic Fall Detection for Elderly Using RGBD Cameras", International Conference on Computers for Handicapped Persons, vol. 7382, 2012, 8 pages.

Shotton et al., "Real-Time Human Pose Recognition in Parts from a Single Depth Image", IEEE Conference on Computer Vision and Pattern Recognition, Jun. 2011, 8 pages.

(Continued)

*Primary Examiner* — Talha M Nawaz
(74) *Attorney, Agent, or Firm* — Laine IP Oy (57) ABSTRACT

According to an example aspect of the present invention, there is provided an apparatus (160, 170) comprising a receiver configured to receive anonymized sensor information, at least one processing core configured to convert the anonymized sensor information into personal sensor information based at least partly on personal information, and a memory interface configured to, under control of the at least one processing core, access the personal information.

9 Claims, 6 Drawing Sheets

(56) References Cited

U.S. PATENT DOCUMENTS

| | | | | |
|---|---|---|---|---|
| 2011/0209214 A1* | 8/2011 | Simske | .............. | G06K 9/00885 |
| | | | | 726/21 |
| 2011/0246123 A1* | 10/2011 | DelloStritto | ............. | A61B 5/11 |
| | | | | 702/141 |
| 2012/0124604 A1* | 5/2012 | Small | ................ | H04N 21/4223 |
| | | | | 725/12 |
| 2013/0095459 A1* | 4/2013 | Tran | .................... | G06F 19/3475 |
| | | | | 434/247 |
| 2013/0108105 A1 | 5/2013 | Yoo et al. | | |
| 2014/0122700 A1* | 5/2014 | Jung | .................. | G06F 21/6254 |
| | | | | 709/224 |
| 2014/0142729 A1* | 5/2014 | Lobb | ..................... | G06F 3/0304 |
| | | | | 700/90 |
| 2016/0277435 A1* | 9/2016 | Salajegheh | ......... | G06F 11/3409 |
| 2018/0307859 A1* | 10/2018 | LaFever | ................. | G16H 10/60 |

OTHER PUBLICATIONS

Niemi, "Privacy, Identity and Trust in Context-Aware Mobile Services", IEEE 10th International Conference on Trust, Security and Privacy in Computing and Communications (TrustCom), Nov. 16-18, 2011, pp. 9-10.

"Data De-identification: An Overview of Basic Terms", Privacy Technical Assistance Center, 2013, pp. 1-7.

Chaaraoui et al., "A Vision-Based System for Intelligent Monitoring: Human Behaviour Analysis and Privacy by Context", Sensors (Basel), vol. 14, No. 5, May 2014, pp. 8895-8925.

International Search Report and Written Opinion received for corresponding Patent Cooperation Treaty Application No. PCT/FI2015/050583, dated Jan. 7, 2016, 18 pages.

* cited by examiner

PRIVACY PRESERVING MONITORING

RELATED APPLICATION

This application was originally filed as PCT Application No. PCT/FI2015/050583 filed Sep. 7, 2015.

FIELD

The present invention relates to monitoring and communicating monitored information.

BACKGROUND

Monitoring of activity, such as activity of humans, may be beneficial in that it may enable remote supervision of persons, such as children or the elderly, who may be memory-impaired. By remotely monitoring such persons, on-site supervision may be rendered unnecessary or it may be performed less frequently.

Remote monitoring of elderly persons may enable these persons to reside in their homes for a longer time, as they need not be relocated to a care facility when a risk of a fall increases. This is so, since a fall may be detectable via the remote monitoring, and appropriate help may be dispatched responsive to the fall occurring. Similarly children may, in some cases, be left at home in case they are no longer very small, and an eye can be kept on them via a remote supervision system to ensure they do not start operating a gas oven, for example.

One way to implement remote monitoring is a closed-circuit television, CCTV, system. A CCTV system comprises at least one camera feeding a video stream to a monitor, which may be located in a monitoring station which houses one or more such monitors. A human supervisor can keep an eye on the monitor or monitors to observe events that occur in the fields of vision of video cameras feeding video streams to the monitoring station.

A drawback in a simple CCTV system is that the video streams may be intercepted. In case video cameras are in homes, an attacker would by intercepting the video streams be enabled to observe what happens in homes, which would amount to a breach in privacy. The breach in privacy might be used to plan crimes, such as timing burglaries to times when occupants are absent, or inappropriately obtaining commercial or personal information.

Encrypting a video feed at the source, and decrypting it at a monitoring station, may at least partly address privacy concerns of remote monitoring. Encrypting may employ symmetric encrypting, where encrypting and decrypting use the same key, or encrypting may employ public key cryptography, where a public key is used to encrypt and a private key is used to decrypt.

SUMMARY OF THE INVENTION

The invention is defined by the features of the independent claims. Some specific embodiments are defined in the dependent claims.

According to a first aspect of the present invention, there is provided an apparatus comprising a receiver configured to receive anonymized sensor information, at least one processing core configured to convert the anonymized sensor information into personal sensor information based at least partly on personal information, and a memory interface configured to, under control of the at least one processing core, access the personal information.

Various embodiments of the first aspect may comprise at least one feature from the following bulleted list:

- the personal information comprises at least one of the following: metadata, a name of a natural person, an identifier of a natural person, a street address and an object identifier
- the object identifier comprises an identifier of a personal emergency alarm device
- the at least one processing core is configured to associate the personal information with the anonymized sensor information based on a mapping, the mapping being based on at least one of: a network address the anonymized sensor information is received from, a code received with the anonymized sensor information and a resolution of the anonymized sensor information
- the resolution of the anonymized sensor information comprises at least one of a temporal resolution and an image resolution
- the personal information comprises at least one limb length information element, and converting the anonymized sensor information into personal sensor information comprises adjusting at least one limb length comprised in the anonymized sensor information into a limb length corresponding to the limb length information element
- the personal information comprises an encryption key, and converting the anonymized sensor information into personal sensor information comprises applying the encryption key to the anonymized sensor information to obtain information defining at least one joint position
- the anonymized sensor information comprises an obfuscated skeletal model, and converting the anonymized sensor information into personal sensor information comprises undoing obfuscation of the skeletal model to obtain a representation of a skeletal model of a person
- the apparatus is further configured to provide the personal sensor information to a user device.

According to a second aspect of the present invention, there is provided an apparatus comprising a sensor interface configured to receive sensor information, at least one processing core configured to obtain, from the sensor information, anonymized sensor information, and a transmitter configured to, under control of the at least one processing core, transmit the anonymized sensor information.

Various embodiments of the second aspect may comprise at least one feature from the following bulleted list:

- the at least one processing core is configured to obtain the anonymized sensor information from the sensor information based at least partly on personal information
- the anonymized sensor information comprises an obfuscated skeletal model, and the at least one processing core is configured to convert the sensor information into anonymized sensor information by obfuscating a skeletal model of a person
- the at least one processing core is configured to obfuscate the skeletal model of the person, at least in part, by replacing at least one limb length comprised in the skeletal model with another limb length
- the at least one processing core is configured to obfuscate the skeletal model of the person, at least in part, by replacing at least one joint position comprised in the skeletal model with another joint position
- the at least one processing core is configured to furnish the anonymized sensor information with a set of joint positions in encrypted form.

According to a third aspect of the present invention, there is provided a method comprising receiving anonymized sensor information, converting the anonymized sensor information into personal sensor information based at least partly on personal information, and accessing the personal information.

Various embodiments of the third aspect may comprise at least one feature corresponding to a feature from the preceding bulleted list laid out in connection with the first aspect.

According to a fourth aspect of the present invention, there is provided a method comprising receiving sensor information, obtaining, from the sensor information, anonymized sensor information, and transmitting the anonymized sensor information.

Various embodiments of the fourth aspect may comprise at least one feature corresponding to a feature from the preceding bulleted list laid out in connection with the second aspect.

According to a fifth aspect of the present invention, there is provided an apparatus comprising means for receiving anonymized sensor information, means for converting the anonymized sensor information into personal sensor information based at least partly on personal information, and means for accessing the personal information.

According to a sixth aspect of the present invention, there is provided an apparatus comprising means for receiving sensor information, means for obtaining, from the sensor information, anonymized sensor information, and means for transmitting the anonymized sensor information.

According to a seventh aspect of the present invention, there is provided a non-transitory computer readable medium having stored thereon a set of computer readable instructions that, when executed by at least one processor, cause an apparatus to at least receive anonymized sensor information, convert the anonymized sensor information into personal sensor information based at least partly on personal information, and access the personal information.

According to an eighth aspect of the present invention, there is provided a non-transitory computer readable medium having stored thereon a set of computer readable instructions that, when executed by at least one processor, cause an apparatus to at least receive sensor information, obtain, from the sensor information, anonymized sensor information, and transmit the anonymized sensor information.

According to a ninth aspect of the present invention, there is provided a computer program configured to cause a method in accordance with at least one of the third aspect and the fourth aspect to be performed.

EMBODIMENTS

By separating personal information from a data flow of monitoring data, privacy may be protected in case communication of the monitoring data is intercepted, or in case archived monitoring data is stolen. Personal information, which may include names, addresses and physical characteristics, may be stored separately, such that the monitoring data may only be used to draw conclusions when applied together with the personal information.

Figure 1:
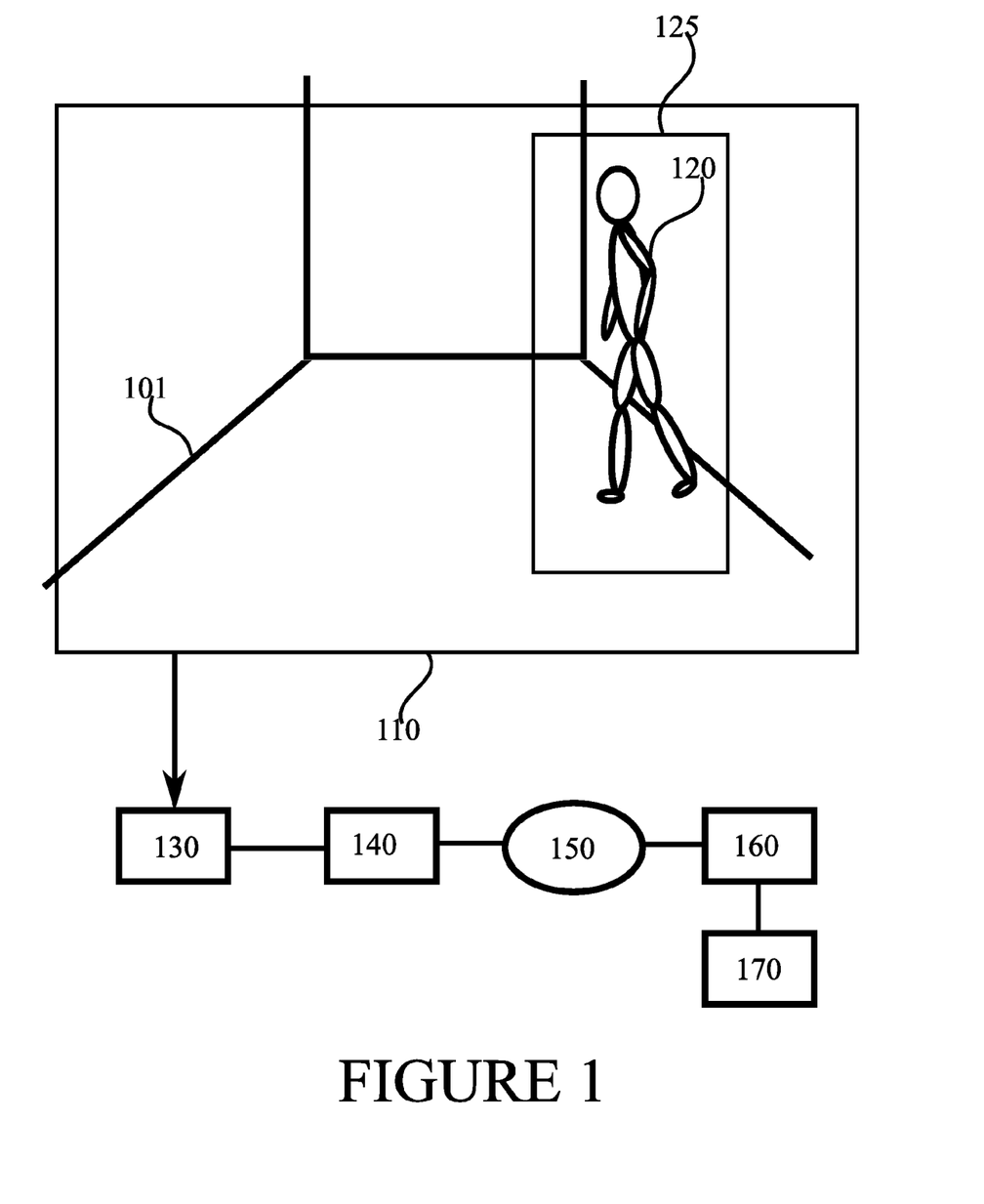
FIG. 1 illustrates a system in accordance with at least some embodiments of the present invention.

FIG. 1 illustrates a system in accordance with at least some embodiments of the present invention. The system of FIG. 1 comprises a camera 130, which is configured to obtain and image of view 110. The image may be obtained, using a light-sensitive sensor element comprised in camera 130, for example, continuously, periodically or triggered by a motion detector. A continuously obtained image may comprise a video feed. The light-sensitive sensor element may comprise a charge-coupled device, CCD, sensor, for example. The light-sensitive sensor element may be arranged to obtain colour images, or black-and-white images, for example. Motion detection may be based on depth or vision based principles, for example.

View 110 is in the example of FIG. 1 directed to a room, the room being schematically denoted in FIG. 1 by lines 101 indicating a floor and walls. Sensor 130 may comprise, for example, a surveillance camera arranged to provide for monitoring of room 101, such that persons in the room may be provided with assistance or advice should they need it. Persons in the room may need assistance in case they fall on the floor and are unable to get up, suffer a heart attack, stroke or develop another kind of medical emergency, or get lost, for example.

Person 120 is illustrated as being in room 101 in FIG. 1. Room 101 may comprise a room in a home of person 120. In this case, images obtained by sensor 130 are personal in nature, since they provide a view into a private home and may even disclose what the inhabitant is doing in his home. On the other hand, in order to be able to provide assistance to person 120 when needed, images obtained by sensor 130 may need to be provided, in one form or another, outside of the home where they are originally obtained. Sensor 130 may be configured to determine a sub-view 125 where person 120 is currently moving. In general, images or other sensor information obtained by sensor 130 may be considered to be monitoring data. A processing core of sensor 130 may obtain sensor information via a sensor interface, which may comprise, for example, an electronic pathway from a sensor element comprised in sensor 130 toward the processing core comprised in sensor 130. Alternatively, where sensor 130 comprises two distinct physical units, a sensor interface may comprise a receiver in one of the two distinct physical units that is arranged to receive the sensor information from another one of the two distinct physical units, wherein the another one of the two distinct physical units comprises the sensor element.

Sensor information obtained by sensor 130 may be transmitted using various networking technologies. For example, sensor 130 may provide the information to a wireless local area network, WLAN, access point, AP, 140. The connection between sensor 130 and WLAN AP 140 may be wireless and encrypted, for example. Alternatively, device 140 may comprise an Ethernet hub, in which case the connection between sensor 130 and hub 140 may be wire-line. Also a wire-line connection may be encrypted. Device 140 may be communicatively coupled, over network 150, with interpretation device 160. Network 150 may comprise the Internet, and/or a corporate or Internet service provider, ISP, network. Interpretation device 160 may, after processing, provide the sensor information further to user device 170. User device 170 may comprise a laptop or desktop computer, a mobile phone or smartphone, or other suitable device, for example. In some embodiments, interpretation device 160 and user device 170 are the same device.

Prior to transmitting the sensor information obtained by sensor 130 toward interpretation device 160, the sensor information may be converted into anonymized sensor information. Where the sensor information is not image data, it may be obtained by a sensor that is not a camera. For example, a temperature sensor may obtain temperature sensor information from room 101. Therefore, a camera and images are an example of a sensor and sensor information, respectively, such that the invention is not limited to cameras and image data. In general, sensor information that is not anonymized may be referred to as personal sensor information.

Anonymized sensor information may differ from sensor information obtained in sensor 130 in that the anonymized sensor information contains less personal information relating to person 120 than the sensor information. In general, anonymized sensor information may comprise sensor information that lacks metadata. Anonymized sensor information may comprise sensor information that lacks personal identifiers or addresses. For example, in case sensor 130 furnishes sensor information it generates with metadata, the metadata may be at least partially removed. Such metadata may include an identifier of sensor 130, an address of room 101, a name of person 120, an identifier of an object, or other data. For example, where sensor 130 is a temperature sensor, temperature readings with no address information are less personal, since in case such information is stolen, the information may be impossible to associate with any specific room or address. As a further example, where sensor 130 is a motion sensor, the metadata may comprise an identifier of a refrigerator, to enable drawing conclusions concerning how often and/or how recently the refrigerator has been accessed. When the identifier of the refrigerator is removed to anonymize the sensor information, the motion sensor output is less personal since it is more difficult to associate with the movements of the specific person.

Interpretation device 160 may be provisioned with the personal information, at least in part, that is removed from the sensor information when it is converted into anonymized sensor information. Interpretation device 160 may be configured to reverse the conversion of the sensor information to anonymized sensor information, thereby obtaining from the anonymized sensor information the original sensor information, or at least information that in certain regards resembles the original sensor information. De-anonymized sensor information, known as personal sensor information, may comprise at least some of the personal information removed in the process of conversion to anonymized sensor information. In selecting which metadata to use in reversing the conversion, interpretation device 160 may be configured to use a mapping, the mapping being based on at least one of: a network address the anonymized sensor information is received from, a code received with the anonymized sensor information and a resolution of the anonymized sensor information. The code may be pseudorandom, and/or the code may be updated periodically.

The network address may comprise, for example, an internet protocol, IP, address of AP or hub 140, sensor 130 or another node the anonymized sensor information is sent from. A code may be assigned to sensor 130, or a site where sensor 130 is located, such that interpretation device 160 is provided with the code and an address and/or other information on the site. In some embodiments, interpretation device 160 is configured to assess what the resolution of the anonymized sensor information is. For example, in case the anonymized sensor information comprises images and their resolution is 640×480, interpretation device 160 may be configured to select a first address. In case the anonymized sensor information comprises images and their resolution is 1048×768, interpretation device 160 may be configured to select a second address. As another example, in case the anonymized sensor information comprises non-image data, it may have a temporal resolution, by which it may be meant, for example, a sampling frequency. In such cases, a temporal frequency of 0.1 Hertz, Hz, may be associated with a third address, and a temporal frequency of 10 Hz may be associated with a fourth address. 0.1 Hz may be appropriate for temperature data, while 10 Hz may be appropriate for motion sensor or gyroscope data, for example.

The personal information may be provided to interpretation device 160 in an initial phase of the monitoring. For example, the personal information may be transferred over an encrypted protocol connection, such as https or ssh. In some embodiments, the personal information is provided, in part or in whole, from sensor 130 to a mobile device over a short-range connection, and then from the mobile device to interpretation device 160 using a secure communication program present in the mobile device and interpretation device 160. The mobile device may be operated by a same organization as operated interpretation device 160 and/or the monitoring activity. The initial phase of the monitoring may comprise a setup or installation phase, for example.

In some embodiments, the personal information that interpretation device 160 uses to reverse the conversion of the sensor information to anonymized sensor information may be provided to law enforcement. To enable this, interpretation device 160 or another node may have an interface that law enforcement may use to request the personal information. To protect privacy of person 120, the interface may only be accessible to parties who hold a private key, for example a private key of a police department. The interface may, when queried, be configured to provide a nonce to the querying party, after which the querying party may sign the nonce with the private key and return the signed nonce to the interface. The interface may them verify the signature is correct using a public key that corresponds to the private key. The personal information may subsequently be provided using a cryptographic protocol connection, such as, for example, https. Alternatively, the personal information may be provided only in person to police officers who have a valid warrant for the personal information, the warrant being issued by a district court, for example. As a yet further alternative, the interface may be configured to only respond to requests for personal information that originate from a certain address, the address being assigned to, for example the police department.

Figure 2:
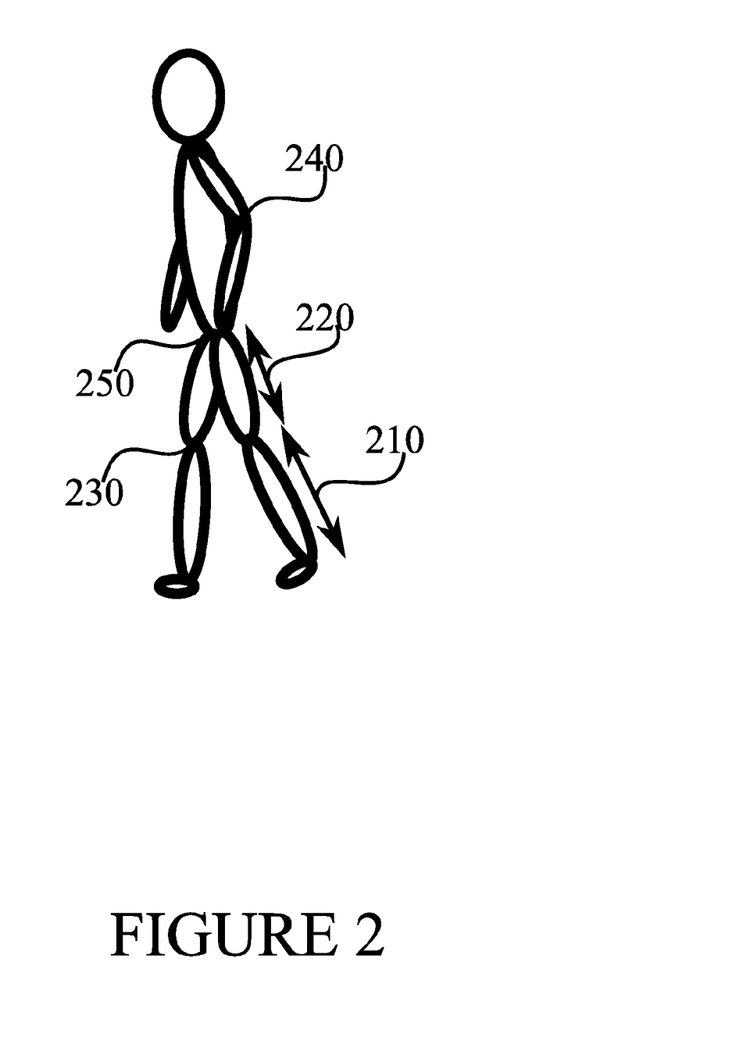
FIG. 2 illustrates a skeletal model in accordance with at least some embodiments of the present invention.

FIG. 2 illustrates a skeletal model in accordance with at least some embodiments of the present invention. A video sensor, or a set of at least two video sensors, may be arranged to recognize a person, such as person 120 of FIG. 1, in a field of vision and to determine the orientation and position the person is in. For example, Microsoft Kinect implements skeletal tracking of persons, reference is made to document [1]. For example, initially an analysis may be performed concerning possible positions for human joints to identify an initial position of the skeletal model, and subsequently changes to joint positions can be tracked as changes relative to the initial position. Kalman filtering or related methods may be employed to enforce temporal and kinematic coherence for the succession of joint positions.

A skeletal model may comprise a set of limb lengths and a set of joint positions. The limb lengths and joint positions together describe the orientation and size of a person's body. Limb lengths comprised in the skeletal model may comprise at least one of: thigh length, shin length, forearm length, arm length and spine length. Limb lengths of a person are static or changing only slowly, for example in the case of children limb lengths grow slowly, and in the elderly the spine may become compressed over time. Joint positions comprised in the skeletal model may comprise at least one of left and right elbow positions, left and right wrist positions, left and right knee positions, left and right hip positions and at least one neck position. There are two independent elbow joint positions, while forearms are typically at least approximately of the same limb length. In a skeletal model, the left-side limbs may be assumed to be the same length as right-side limbs, or all limbs may be provided individual limb lengths. In some embodiments, the spine is modelled as a plurality of spine joints, to enable visualizing the position of the spine.

In FIG. 2, some limb lengths and joints have been identified. Shin length 210 and thigh length 220 are comprised in the set of limb lengths in the skeletal model. The positions of left elbow 240, right knee 230 and right hip 250 are comprised in the set of joint positions in the skeletal model. The skeletal model may comprise also limb lengths and positions of joints not identified explicitly in FIG. 2. A joint position may be expressed as an angle deviation from a neutral position in the skeletal model, for example.

A skeletal model of a person, which may be a still or a continuously updated skeletal model, may be considered an example of sensor information. Since the skeletal model comprises personally valid information in the form of limb lengths, for example, the skeletal model is personal and thus to be protected against disclosure. Furthermore, a continuously updated skeletal model reveals, at least in part, what the person is doing wherefore also movements of such a skeletal model are personal in nature.

Where a sensor arrangement is arranged to derive a skeletal model of a person, the skeletal model may be provided to an interpretation device in obfuscated form, that is, converted into anonymized sensor information. To convert sensor information comprising a skeletal model into anonymized form, limb lengths present in the skeletal model may be removed, replaced with constants, or replaced with randomly or pseudo-randomly generated limb lengths. In general, removing limb lengths or replacing them with random, pseudorandom or constant limb lengths may be known as limb length obfuscation. Likewise, joint positions may be encrypted in connection with converting the sensor information comprising the skeletal model into anonymized form. Encrypting joint positions may, generally, be considered an example of joint position obfuscation.

A video monitoring system may be constructed, wherein in an initial phase an image may be captured of a room, the image being then provided to the interpretation device for use as a background. In the initial phase, limb lengths may be provided to the interpretation device. Further, in the initial phase, an address of the location that is under monitoring may be provided to the interpretation device. Subsequently, in a running monitoring phase, the joint positions determined at the location that is under monitoring are communicated to the interpretation device, optionally in encrypted form. In some embodiments, also random, pseudorandom or constant limb lengths are communicated to the interpretation device.

In some embodiments, limb lengths are simply not communicated at all in the running monitoring phase, since the interpretation device already has them from the initial phase. The interpretation device is then enabled to reverse the encryption of the joint positions, to attach correct limb lengths to the skeletal model and to superimpose a visual representation of the resulting skeletal model onto the background to obtain an approximation of a view into the room under monitoring. Alternatively to the interpretation device, a separate user device may superimpose the visual representation of the skeletal model on the background. This way, a visual representation of the person can be seen to enable drawing conclusions on possible need for personal assistance, for example. The limb lengths enable determining whether the person is an adult or a child. Joint positions may assist in determining whether the person is elderly as opposed to a non-elderly adult, since elderly people may have characteristic gait and/or posture.

Communicating the encrypted joint positions and, optionally, the obfuscated limb lengths, provides for a high level of compression in data transfer, saving energy and enabling a large number of monitoring feeds on a given data connection. Furthermore, using the anonymizing methods of encrypting the joint positions and obfuscating limb lengths provides the advantage that no personal information needs to be communicated in non-obfuscated format.

Figure 3:
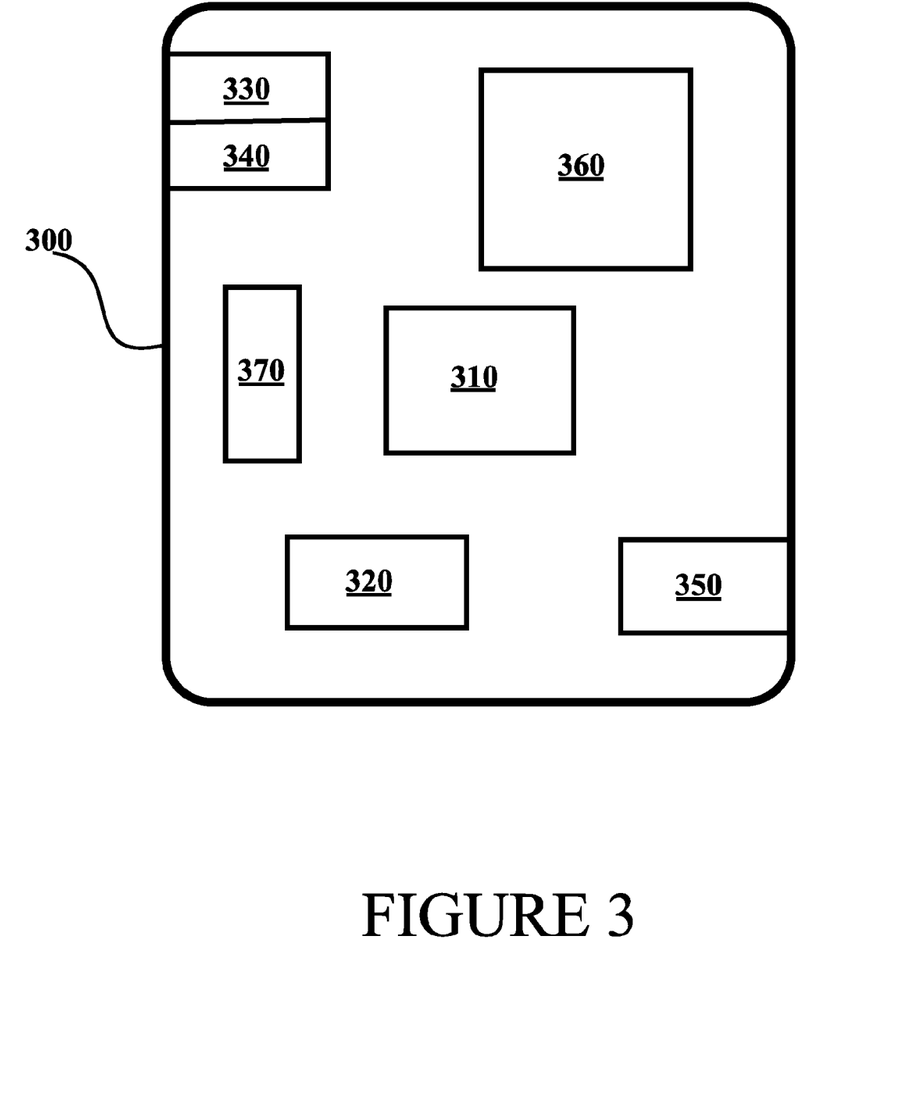
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, in applicable parts, a device such as interpretation device 160 or user device 170 of FIG. 1. At least certain parts illustrated in FIG. 3 may also be applicable to a sensor-side apparatus that is configured to anonymize sensor information. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Core processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may be accessed via a memory interface comprised in device 300. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls and/or to observe monitoring data.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
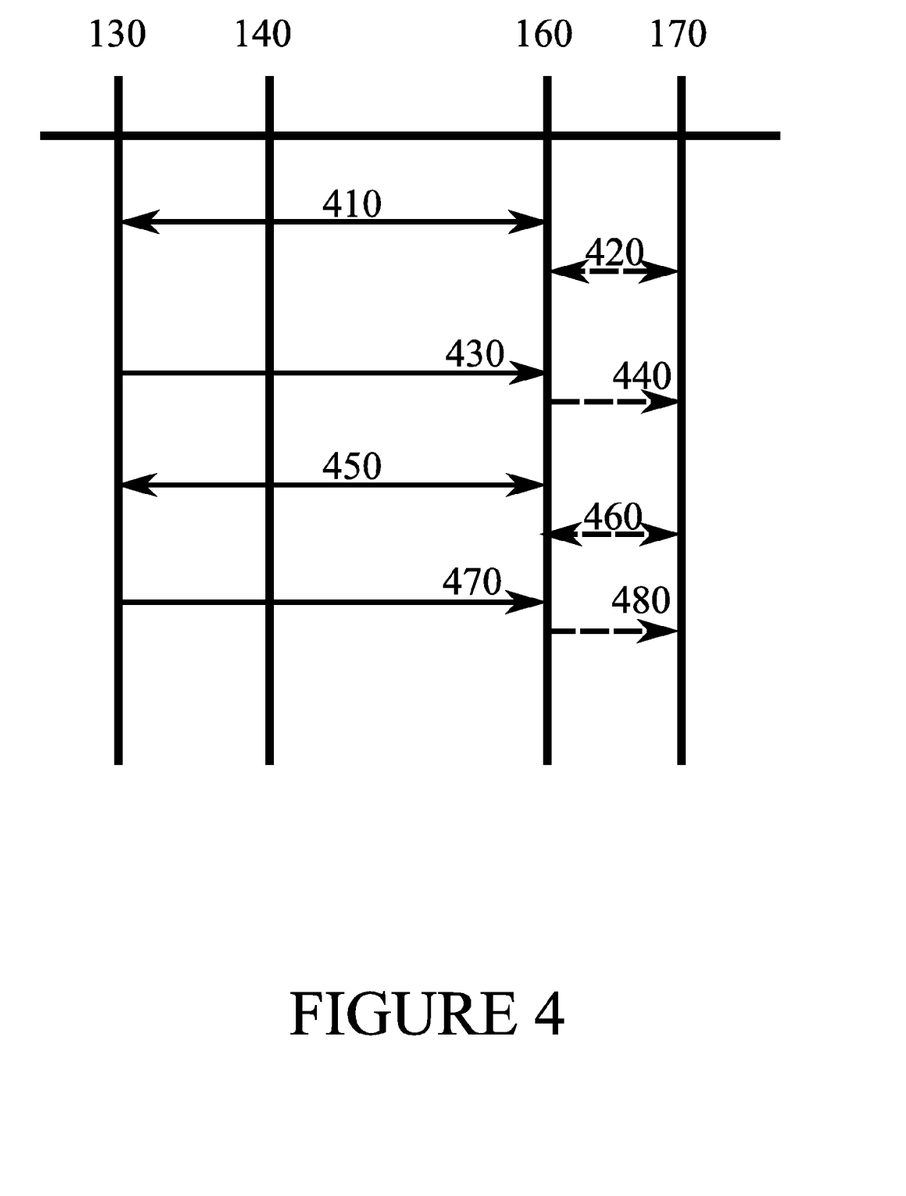
FIG. 4 illustrated signalling in accordance with at least some embodiments of the present invention.

FIG. 4 illustrated signalling in accordance with at least some embodiments of the present invention. On the vertical axes are disposed, from left to right, sensor 130 or a device associated therewith, AP 140, interpretation device 160 and, finally, user device 170. Time advances from the top toward the bottom. In some embodiments, interpretation device 160 and user device 170 are one and the same device. In other words, in these embodiments there is no separate user device, rather, the user uses the interpretation device, which may comprise a smartphone, for example.

Phase 410 comprises an initial phase, wherein personal information is communicated from sensor 130, or a device associated therewith, to interpretation device 160, as described above. The initial phase may comprise communicating at least one of background image data, limb lengths, address information and at least one object identifier, for example. In optional phase 420, the information received in initial phase 410 is communicated further to user device 170, at least in part.

Subsequently to the initial phase, in phase 430 a first running monitoring phase takes place. In first running monitoring phase, anonymized sensor information is provided to interpretation device 160, wherein the anonymized sensor information is derived in the sensor end as described above in connection with FIG. 1 and FIG. 2. In optional phase 440, interpretation device, after obtaining from the anonymized sensor information personal sensor information, provides the obtained personal sensor information to user device 170. First running monitoring phase may be continuous in nature, in that anonymized sensor information may be provided to interpretation device 160 repeatedly or continuously during this phase, and the anonymized sensor information is converted in interpretation device 160 to personal sensor information.

Phase 450, which is optional, may comprise an update of initial phase 410, for example, an update to a background image where the sensor information obtained by sensor 130 is image data. In optional phase 460, the updated information communicated in optional phase 450, where that phase was present, may be forwarded to user device 170.

Second running monitoring phase 470 may operate similarly to first monitoring phase 430, but using the updated information. Optional phase 480 may resemble optional phase 440.

Figure 5:
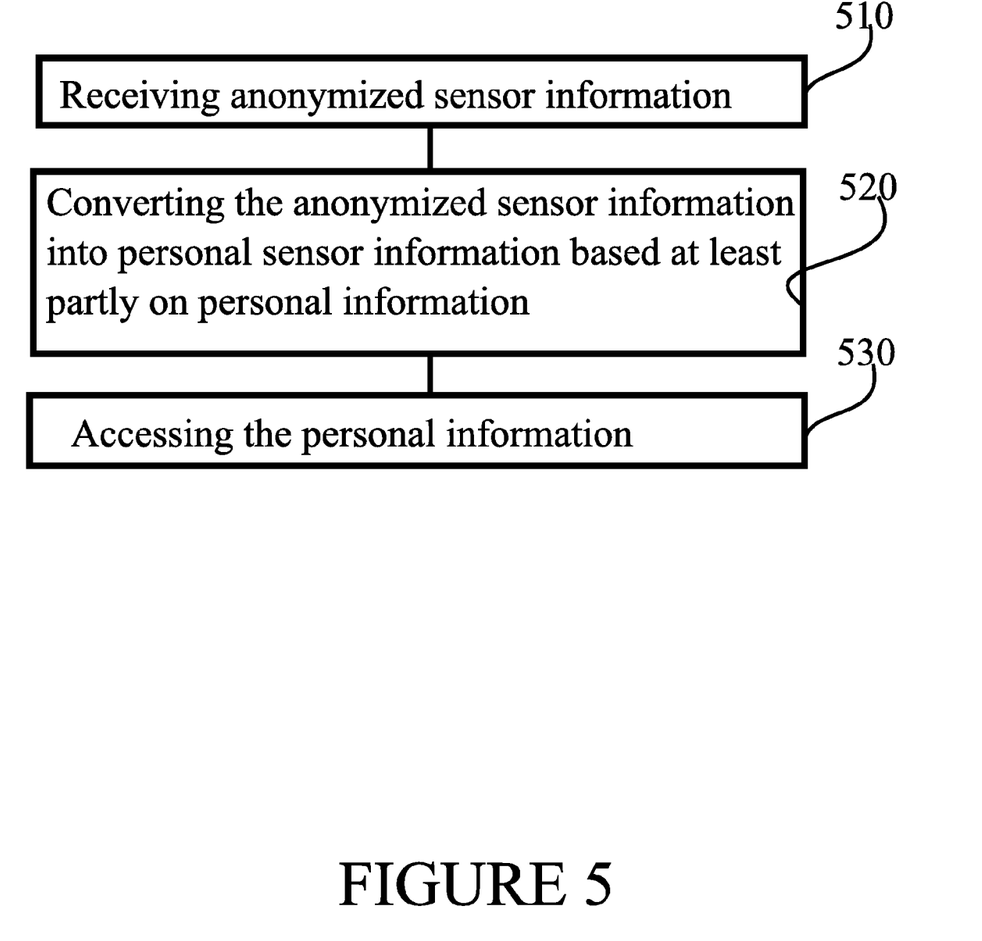
FIG. 5 is a first flow graph of a first method in accordance with at least some embodiments of the present invention.

FIG. 5 is a first flow graph of a first method in accordance with at least some embodiments of the present invention. The phases of the illustrated method may be performed in interpretation device 160 or user device 170, for example, or in a control device configured to control the operation thereof, when implanted therein.

Phase 510 comprises receiving anonymized sensor information. Phase 520 comprises converting the anonymized sensor information into personal sensor information based at least partly on personal information. Finally, phase 530 comprises accessing the personal information. Phase 530 may take place before phase 520.

Figure 6:
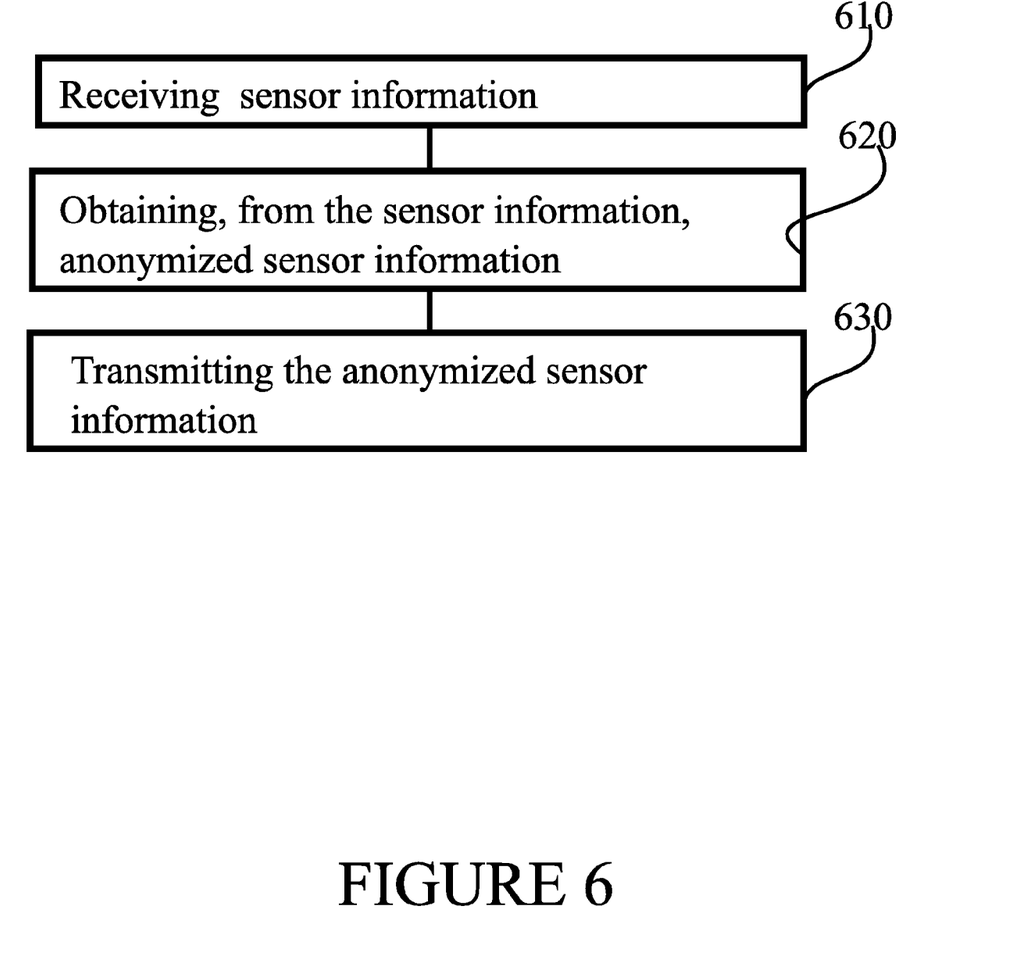
FIG. 6 is a second flow graph of a second method in accordance with at least some embodiments of the present invention.

FIG. 6 is a second flow graph of a second method in accordance with at least some embodiments of the present invention. The phases of the illustrated method may be performed in interpretation sensor 130 or an associated device, for example, or in a control device configured to control the operation thereof, when implanted therein.

Phase 610 comprises receiving sensor information. Phase 620 comprises obtaining, from the sensor information, anonymized sensor information. Phase 630 comprises transmitting the anonymized sensor information. The sensor information may be received from a sensor element or from a sensor device, for example.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in enhancing privacy and/or information security in monitoring systems.

ACRONYMS LIST

AP Access point
CCD charge-coupled device
CCTV closed-circuit television
HTTP Hypertext transfer protocol
https HTTP over TLS
IP internet protocol
ISP internet service provider
ssh Secure shell
TLS Transport layer security
WLAN wireless local area network

| REFERENCE SIGNS LIST | |
|---|---|
| 110 | View |
| 120 | Person |
| 130 | Sensor |
| 140 | WLAN AP or hub |
| 150 | Network |
| 160 | Interpretation device |
| 170 | User device |
| 210 | Shin length |
| 220 | Thigh length |
| 230 | Right knee |
| 240 | Left elbow |
| 150 | Right hip |
| 310-370 | Elements of the device of FIG. 3 |
| 410-480 | Phases of the method of FIG. 4 |
| 510-530 | Phases of the method of FIG. 5 |
| 610-630 | Phases of the method of FIG. 6 |

CITATION LIST

Non Patent Literature

[1]-"Real-Time Human Pose Recognition in Parts from Single Depth Images" (Shotton et al., Microsoft Research Cambridge & Xbox Incubation) http://research.microsoft.com/pubs/145347/BodyPartRecognition.pdf

The invention claimed is:
1. An apparatus comprising:
a receiver configured to receive anonymized sensor information comprising an obfuscated skeletal model;
at least one processing core configured to convert the anonymized sensor information into personal sensor information by undoing obfuscation of the skeletal model to obtain a representation of a skeletal model of a person and by associating personal information with the anonymized sensor information based on a mapping, the mapping being based on at least one of: a network address the anonymized sensor information is received from, a code received with the anonymized sensor information and a resolution of the anonymized sensor information, and wherein the personal information comprises at least one limb length information element, and converting the anonymized sensor information into personal sensor information comprises adjusting at least one limb length comprised in the anonymized sensor information into a limb length corresponding to the limb length information element, and/or the personal information comprises an encryption key, and converting the anonymized sensor information into personal sensor information comprises applying the encryption key to the anonymized sensor information to obtain information defining at least one joint position; and a memory interface configured to, under control of the at least one processing core, access the personal information.

2. The apparatus according to claim 1, wherein the personal information comprises at least one of the following: metadata, a name of a natural person, an identifier of a natural person, a street address and an object identifier.

3. The apparatus according to claim 2, wherein the object identifier comprises an identifier of a personal emergency alarm device.

4. The apparatus according to claim 1, wherein the resolution of the anonymized sensor information comprises at least one of a temporal resolution and an image resolution.

5. The apparatus according to claim 1, wherein the apparatus is further configured to provide the personal sensor information to a user device.

6. An apparatus comprising:
a sensor interface configured to receive sensor information comprising a skeletal model of a person;
at least one processing core configured to convert the sensor information into anonymized sensor information by obfuscating the skeletal model of a person, at least in part, by replacing at least one limb length comprised in the skeletal model with another limb length, and/or by replacing at least one joint position comprised in the skeletal model with another joint position, wherein the anonymized sensor information comprises an obfuscated skeletal model, and by removing at least part of personal information from the sensor information, and
a transmitter configured to, under control of the at least one processing core, transmit the anonymized sensor information comprising the obfuscated skeletal model.

7. The apparatus according to claim 6, wherein the at least one processing core is configured to furnish the anonymized sensor information with a set of joint positions in encrypted form.

8. A method comprising:
receiving sensor information comprising a skeletal model of a person;
converting the sensor information into anonymized sensor information by obfuscating the skeletal model of a person, at least in part, by replacing at least one limb length comprised in the skeletal model with another limb length, and/or by replacing at least one joint position comprised in the skeletal model with another joint position, wherein the anonymized sensor information comprises an obfuscated skeletal model, and by removing at least part of personal information from the sensor information, and
transmitting the anonymized sensor information.

9. The method according to claim 8, wherein the at least one processing core is configured to furnish the anonymized sensor information with a set of joint positions in encrypted form.

* * * * *